(12) United States Patent
Butler et al.

(10) Patent No.: US 9,389,371 B2
(45) Date of Patent: Jul. 12, 2016

(54) FIBER OPTIC CONNECTORS AND INTERFACES FOR FIBER OPTIC CONNECTIVITY THROUGH DEVICE DISPLAY SURFACE, AND RELATED COMPONENTS, SYSTEMS AND METHODS

(71) Applicant: CORNING OPTICAL COMMUNICATIONS LLC, Hickory, NC (US)

(72) Inventors: Douglas Llewellyn Butler, Painted Post, NY (US); Davide Domenico Fortusini, Ithaca, NY (US); Micah Colen Isenhour, Lincolnton, NC (US); Christopher Paul Lewallen, Hudson, NC (US); James Phillip Luther, Hickory, NC (US); Claudio Mazzali, Painted Post, NY (US); Percil Watkins, Conover, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/491,010

(22) Filed: Sep. 19, 2014

(65) Prior Publication Data

US 2016/0085034 A1   Mar. 24, 2016

(51) Int. Cl.
*G02B 6/36* (2006.01)
*G02B 6/38* (2006.01)

(52) U.S. Cl.
CPC ............ *G02B 6/3873* (2013.01); *G02B 6/3826* (2013.01); *G02B 6/3893* (2013.01)

(58) Field of Classification Search
None
See application file for complete search history.

(56) References Cited

U.S. PATENT DOCUMENTS

| | | | |
|---|---|---|---|
| 5,748,825 A | 5/1998 | Rockwell | |
| 6,005,700 A * | 12/1999 | Pressler | G02B 6/0008 235/492 |
| 7,354,205 B2 * | 4/2008 | Sakata | H01R 13/6594 385/53 |
| 8,553,014 B2 | 10/2013 | Holmgren et al. | |
| 2007/0024576 A1 * | 2/2007 | Hassan | G06F 1/1632 345/156 |
| 2007/0280603 A1 * | 12/2007 | Sakata | H01R 13/6594 385/88 |
| 2010/0097567 A1 * | 4/2010 | Rousseau | G02B 27/017 351/158 |
| 2010/0290789 A1 * | 11/2010 | Watanabe | G02B 6/4212 398/164 |
| 2011/0116747 A1 * | 5/2011 | Terlizzi | G02B 6/3817 385/75 |
| 2011/0279902 A1 * | 11/2011 | Freeman | G06F 1/1603 359/613 |
| 2011/0286703 A1 * | 11/2011 | Kishima | G02B 6/4201 385/88 |
| 2012/0120497 A1 * | 5/2012 | Daly | G06F 1/1607 359/601 |
| 2014/0072261 A1 * | 3/2014 | Isenhour | G02B 6/32 385/33 |
| 2015/0153521 A1 * | 6/2015 | Sasaki | G02B 6/4204 385/88 |

* cited by examiner

*Primary Examiner* — Sung Pak

(57) ABSTRACT

A fiber optic connection system is disclosed for optically connecting a fiber optic connector to an internal optical interface of a device through a display surface of the device. Connecting the connector to the device causes a display alignment feature of the connector to be retained against the display surface of the device. This causes a connector optical interface in the connector to optically connect to a device optical interface through the display surface of the device when the connector is connected with the device. One benefit of this arrangement is that a device, such as a smartphone or other small form-factor device for example, may include optical communication hardware that leverages the excellent clarity and flatness of the display surface, such as a display glass for example, to form and maintain a strong fiber optic connection between the connector and the device.

24 Claims, 16 Drawing Sheets

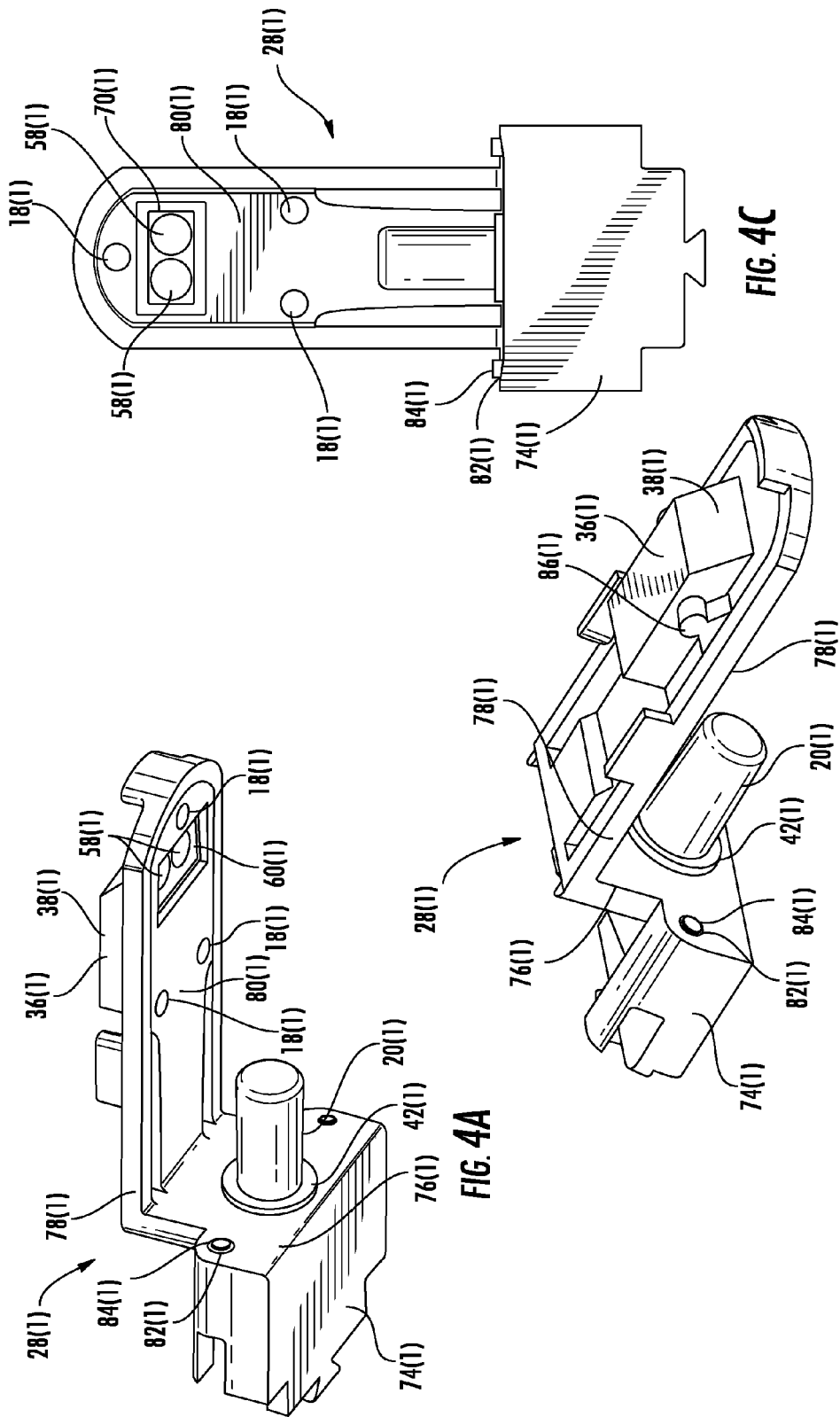

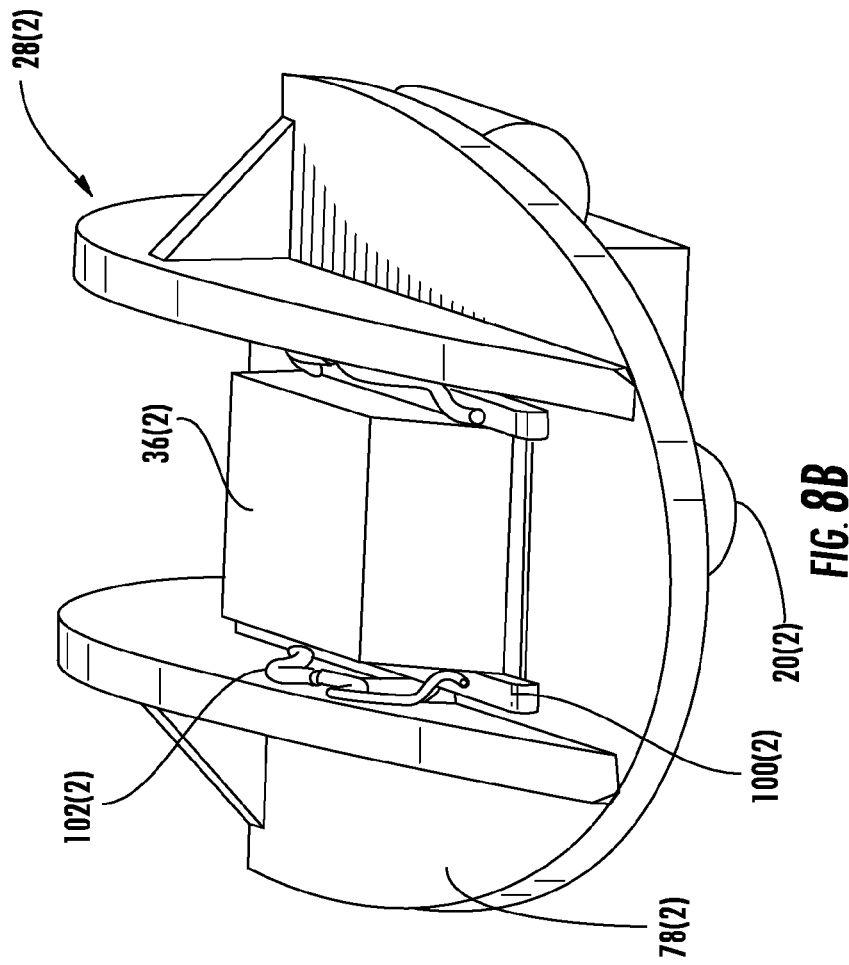
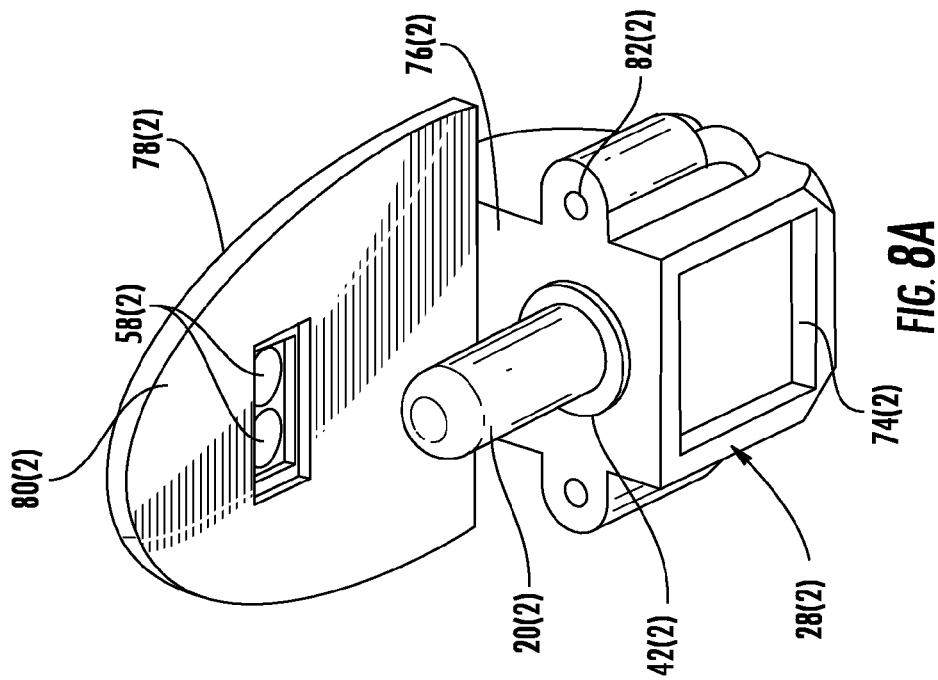

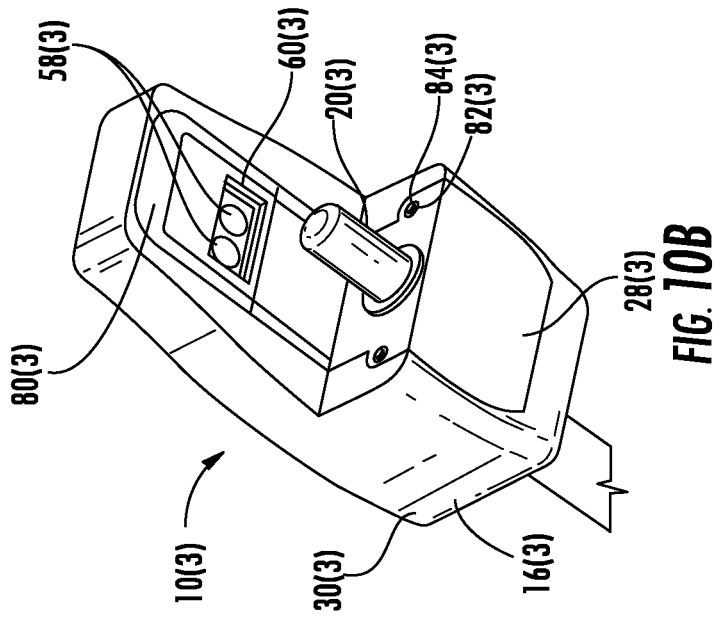
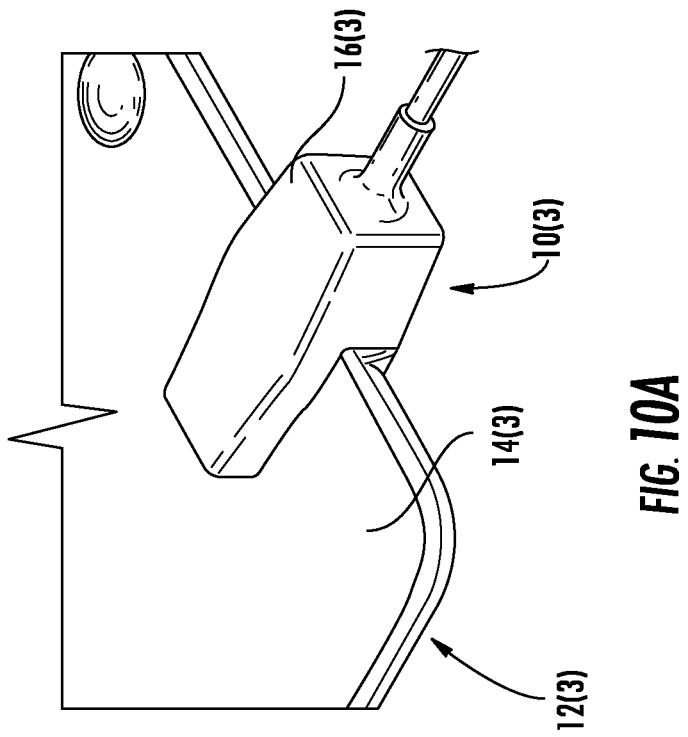

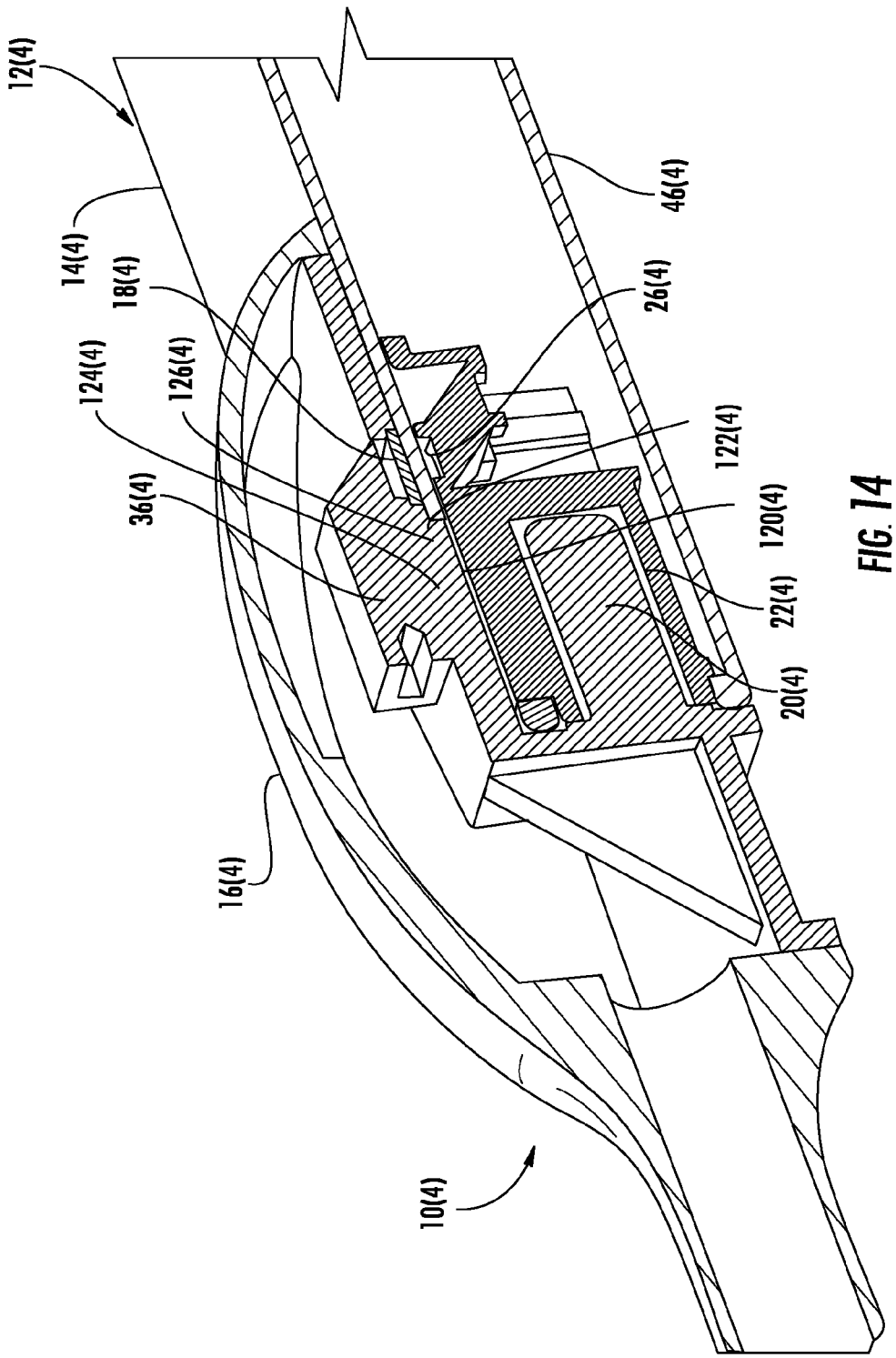

FIBER OPTIC CONNECTORS AND INTERFACES FOR FIBER OPTIC CONNECTIVITY THROUGH DEVICE DISPLAY SURFACE, AND RELATED COMPONENTS, SYSTEMS AND METHODS

FIELD

The disclosure relates generally to fiber optic connectors and interfaces and more particularly to fiber optic connectivity through a display surface of a device.

BACKGROUND

As electronic devices move toward operation at faster data rates, the electrical interfaces on these devices along with the electrical transmission cables will reach their bandwidth capacity limitations. Additionally, electronic devices are trending toward having smaller and thinner footprints. Optical fibers have displaced copper-based connectivity in much of the traditional long-haul and metro telecommunication networks for numerous reasons, such as large bandwidth capacity, dielectric characteristics, and the like. As consumers require more bandwidth for consumer electronic devices, such as smart phones, laptops, and tablets as examples, optical fibers and optical ports for optical signal transmission are being considered for replacing the conventional copper-based connectivity for these applications. Benefits of optical fiber include extremely wide bandwidth and low noise operation.

In this regard, fiber optic plug connectors and fiber optic receptacle connectors (hereinafter "fiber optic plugs" and "fiber optic receptacles," respectively) can be provided to facilitate optical connections in electronic devices with optical fibers for the transfer of light. For example, optical fibers disposed in a fiber optic plug can be optically connected to optical fibers of a fiber optic receptacle disposed in an electronic device for providing an optical connection to the electronic device. To maintain a small form factor of the device, the components used for the fiber optic plug and fiber optic receptacle should be as compact as possible, while maintaining sufficient strength to prevent damage during normal use.

In addition, proper optical alignment of the optical elements within the fiber optic plug and with respect to the receptacle is required to avoid optical signal attenuation. If the optical fibers in a fiber optic plug are not properly aligned with an optical interface such as a ferrule and/or lens element, portions of the optical signals may be lost. Likewise, if the optical interface of the plug is not properly aligned with the fiber optic receptacle, additional optical attenuation may also occur. Thus, optical alignment throughout the plug and receptacle assemblies is required to maintain a strong and accurate optical signal.

SUMMARY

According to an exemplary embodiment, a fiber optic connection system is disclosed for optically connecting a fiber optic connector to an internal optical interface of a device through a display surface of the device. The connector comprises a display alignment feature configured to align with a display surface of the device. Connecting the connector to the device causes the display alignment feature of the connector to be retained against the display surface of the device. This causes a connector optical interface in the connector to optically connect to a device optical interface of the device through the display surface of the device when the connector is connected with the device. One benefit of this arrangement is that a device, such as a smartphone or other small form-factor device for example, may include optical communication hardware that leverages the excellent clarity and flatness of the display surface, such as a display glass for example, to form and maintain a strong fiber optic connection between the connector and the device.

One embodiment of the disclosure relates to a fiber optic connector for optically connecting to a device through a display surface of the device. The connector comprises a display alignment feature configured to align with a display surface of a device. The connector further comprises a connector optical interface configured to optically connect to a device optical interface of the device through the display surface of the device when the display alignment feature is aligned with the display surface of the device.

An additional embodiment of the disclosure relates to an internal optical interface assembly for a device for optically connecting through a display surface of the device. The optical interface assembly comprises an internal optical interface disposed behind a display surface of the device and configured to optically connect to an optical interface of a fiber optic connector through a display surface of the device, when the fiber optic connector is connected to the device.

An additional embodiment of the disclosure relates to a method of optically connecting a connector to a device. The method comprises optically connecting a connector optical interface of a connector to a device optical interface of a device through a display surface of the device. The method further comprises optically communicating between the connector optical interface and the device optical interface through the display surface of the device.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 4A-4C are lower perspective, upper perspective, and bottom views of a connector frame of the connector according to the embodiment of FIG. 1, illustrating the display alignment features and mechanical alignment features of the connector frame;

FIGS. 8A and 8B are lower and upper perspective views of the connector frame of the connector according to the embodiment of FIGS. 6A and 6B, illustrating the display alignment features and mechanical alignment features of the connector frame;

FIGS. 10A and 10B illustrate perspective views of a fiber optic connector according to another alternative embodiment, including a magnetic alignment feature that retains and optically aligns the connector optical interface with the device optical interface;

FIG. 14 is a perspective cutaway view of the fiber optic connector of FIGS. 13A and 13B optically connected to the portable device via the display surface of the device, illustrating the internal components thereof.

DETAILED DESCRIPTION

According to an exemplary embodiment, a fiber optic connection system is disclosed for optically connecting a fiber optic connector to an internal optical interface of a device through a display surface of the device. The connector comprises a display alignment feature configured to align with a display surface of the device. Connecting the connector to the device causes the display alignment feature of the connector to be retained against the display surface of the device. This causes a connector optical interface in the connector to optically connect to a device optical interface of the device through the display surface of the device when the connector is connected with the device. One benefit of this arrangement is that a device, such as a smartphone or other small form-factor device for example, may include optical communication hardware that leverages the excellent clarity and flatness of the display surface, such as a display glass for example, to form and maintain a strong fiber optic connection between the connector and the device.

Figure 1:
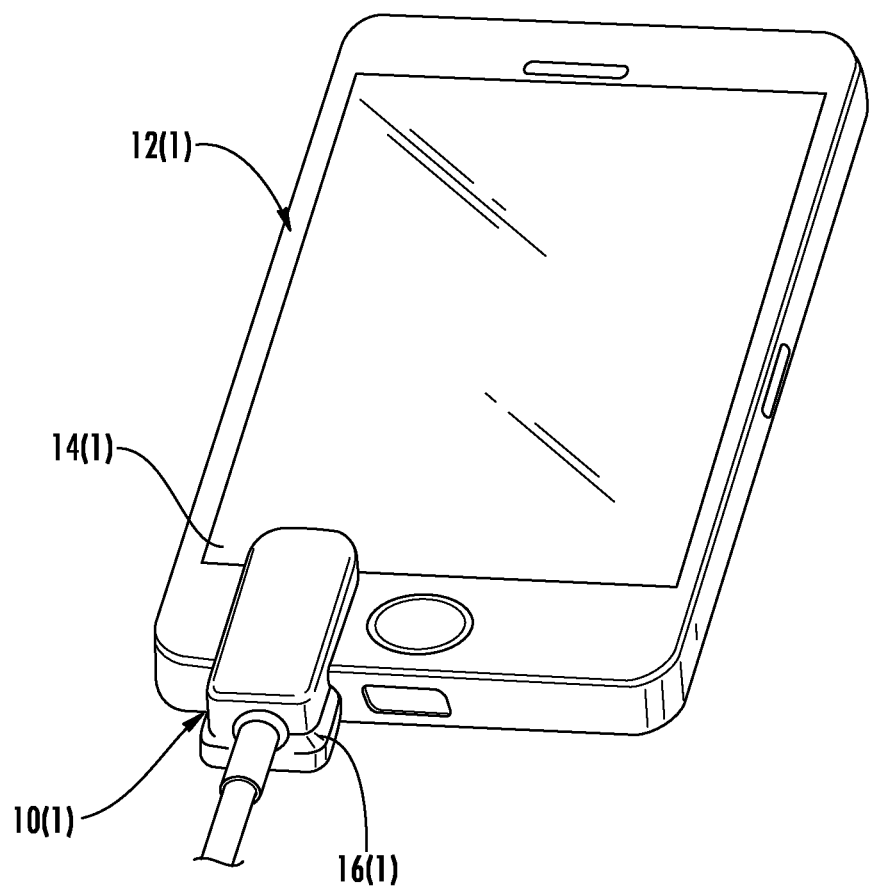
FIG. 1 is a perspective view of a fiber optic connector optically connected to a portable device via the display surface of the device, according to an exemplary embodiment.

In this regard, FIG. 1 is a perspective view of an exemplary fiber optic connector 10(1) configured to optically connect to a device 12(1) through a display surface 14(1) of the device 12 according to a first example. As will be discussed in detail below, the fiber optic connector 10(1) may mechanically connect to the device 12(1) using a conventional plug mechanism, such as an audio-jack plug. However, as will be discussed in detail below, the fiber optic connector 10(1) also establishes an optical connection directly through the display surface 14(1).

Figure 2A:
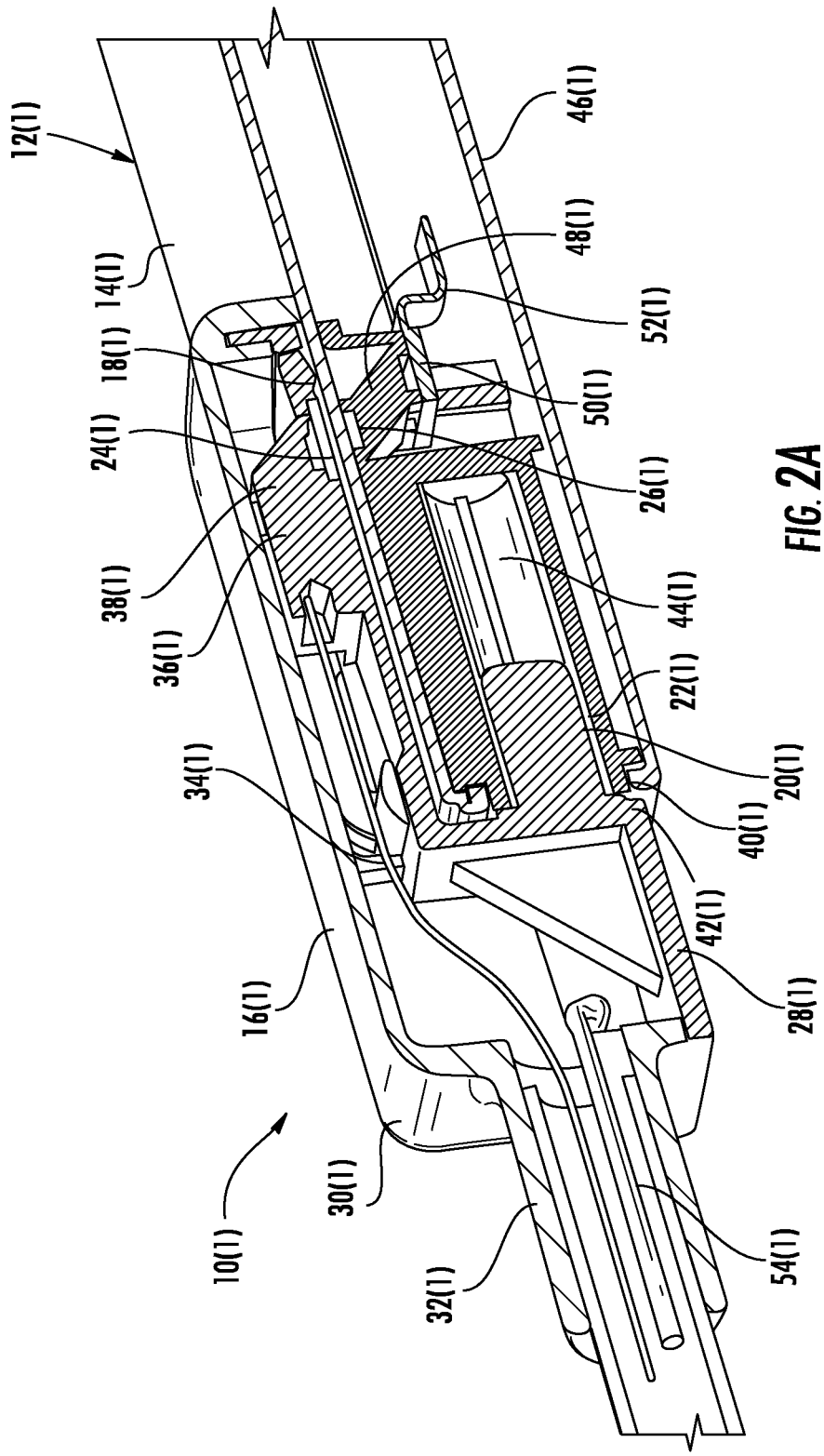
FIGS. 2A and 2B are perspective and side cutaway views of the fiber optic connector of FIG. 1 optically connected to the portable device via the display surface of the device, illustrating the internal components thereof.
Figure 2B:
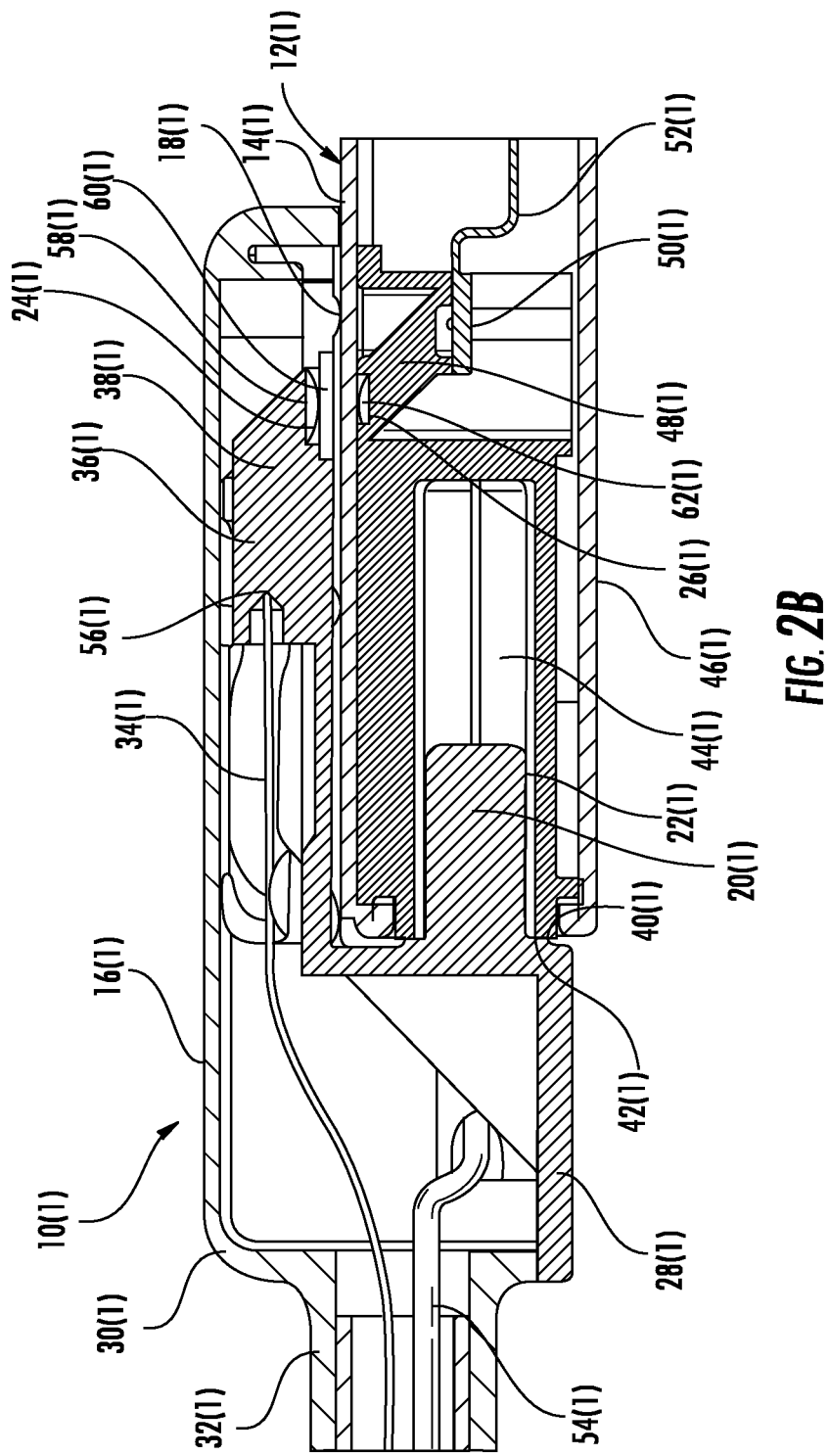

In this regard, FIGS. 2A and 2B are perspective and side cutaway views of the fiber optic connector 10(1) of FIG. 1 optically connected to the device 12(1) via the display surface 14(1) of the device 12(1), illustrated in the internal components thereof. The connector 10(1) comprises a monolithic plug body 16(1) having a display alignment feature 18(1), and a mechanical alignment feature 20(1) configured to mate with a device alignment feature 22(1) of the device 12(1). One advantage of using a monolithic plug body, such as plug body 16(1), is that the number of optical alignment "hand-offs" between different mechanical components is minimized, thereby increasing optical alignment accuracy.

The display alignment feature 18(1) is configured to align with display surface 14(1) of the device 12(1) when the mechanical alignment feature 20 is mated with the device alignment feature 22(1) of the device 12(1). When the mechanical alignment feature 20 is mated with the device alignment feature 22(1), the display alignment feature 18(1) is retained against the display surface 14(1) of the device 12(1). The connector 10(1) includes a connector optical interface 24(1), and the device 12(1) includes a device optical interface 26(1) disposed behind the display surface 14(1) of the device 12(1). When the mechanical alignment feature 20(1) of the connector 10(1) mates with the device alignment feature 22 of device 12(1), the retention of the display alignment feature 18(1) against the display surface 14(1) of the device 12(1) causes the connector optical interface 24(1) to optically align with and connect to the device optical interface 26(1) through the display surface 14(1) of the device 12(1). In this manner, the excellent clarity and smoothness of the display surface 14(1) is used to facilitate optical communication between the connector optical interface 24(1) and the display optical interface 26(1), thereby allowing the device 12 to maintain a compact form factor.

In the embodiment shown by FIGS. 2A and 2B, the connector 10(1) includes a connector frame 28(1) that carries the mechanical alignment features 20(1) and the connector optical interface 24(1). A connector housing 30(1) carries and encloses the connector frame 28(1) and may include a strain relief boot 32(1) for connecting to and retaining a fiber optic cable 33 or other cable. One or more optical fibers 34(1) extends through cable 33(1) and is received in ferrule 36(1). The ferrule 36(1) in turn is configured to direct light between the optical fiber 34(1) and the connector optical interface 24(1). As will be discussed in detail with respect to FIG. 3, the ferrule 36(1) may include a connector mirror assembly 38(1) or other reflective assembly or structure for directing light between the one or more optical fibers 34(1) and the connector optical interface 24(1).

Turning now to the mechanical alignment feature 20(1), when the mechanical alignment feature 20(1) is inserted into device alignment feature 22(1), a longitudinal device stop 40(1) engages longitudinal connector stop 42(1) to limit longitudinal insertion of the mechanical alignment feature 20(1). In this embodiment, the device alignment feature 22(1) comprises a longitudinal bore 44(1) that has a length greater than a length of the mechanical alignment feature 20(1), thereby preventing dust or other debris from impeding full longitudinal insertion of the mechanical alignment feature 20(1) into device alignment feature 22. In one embodiment, the mechanical alignment feature 20(1) may be a plug, such as a standard audio-jack plug, and may also include one or more electrical contacts for providing electrical communication between the connector 10(1) and the device 12(1).

The device alignment feature 22(1) is contained within device body 46(1). Device body 46(1) also retains and supports the display surface 14(1), and the device optical interface 26(1). As shown in FIGS. 2A and 2B, a device mirror assembly 48(1) directs light between the device optical interface 26 and an optical/electrical interface ("O/E interface" hereinafter) 50(1). The O/E interface 50(1) may be connected to other electrical components in the device 12(1) via a ribbon cable 52(1) or other electrical connection. In addition, the connector 10(1) may also include one or more electrical wires 54(1) extending from cable 33(1) and connected to electrical contacts (not shown) to provide electrical communication with the device 12(1) as well.

In order to ensure a strong optical connection with minimal attenuation, it may be desirable to expand a fiber optic light beam when it is directed through the display surface 14(1), for example, to compensate for possible mechanical misalignment of the connector 10(1) with respect to the device 12(1), and to allow for increased manufacturing tolerances. In this regard, FIG. 2B illustrates a focusing lens 58(1) disposed between connector optical interface 24(1) and a window 60(1), which, in this embodiment, receives an expanded beam from a complimentary collimating lens 62(1) of the device optical interface before narrowing the beam to a reduced diameter while directing the beam into optical fiber 34(1). In this regard, FIG. 3 illustrates a schematic representation of the light passing through the device optical interface 26(1), display surface 14(1), and connector optical interface 24(1) in a "periscope"-style arrangement.

Figure 3:
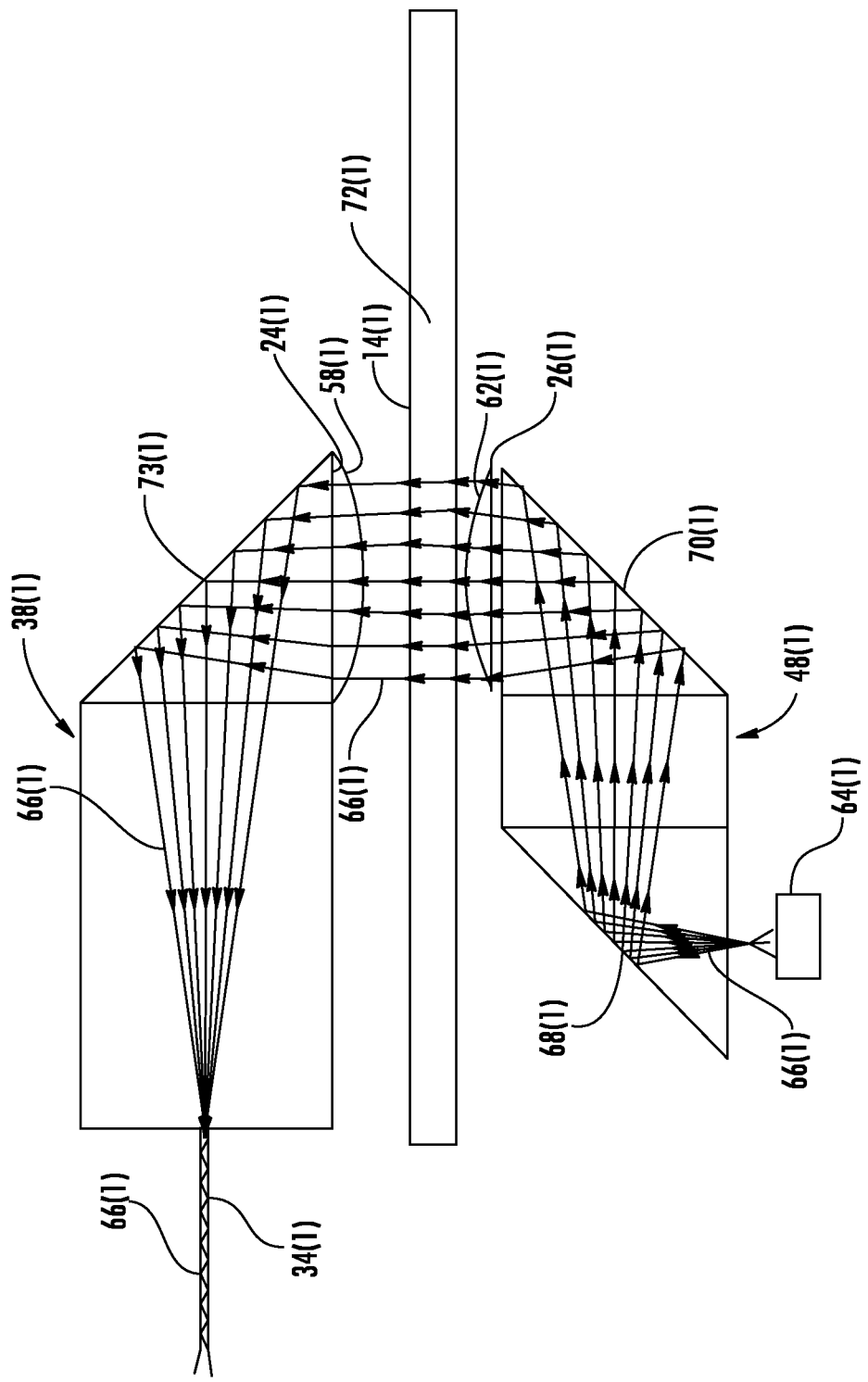
FIG. 3 is a schematic representation of the light passing through the device optical interface, display surface, and connector optical interface, thereby passing light from the device to an optical fiber of the connector, according to an exemplary embodiment.

It should be understood however, that the arrangement of FIG. 3 or similar arrangements may be likewise used to direct light from the optical fiber 34(1) to the device optical interface 26(1) via the connector optical interface 24(1) and display surface 14(1), as well. In such case, lens 58(1) acts as collimating lens and lens 62(1) acts as focusing lens; additionally, a focusing lens may also be formed on the bottom surface of the device mirror assembly 48(1). In the embodiment of FIG. 3, a light-emitting element 64(1), such as a vertical-cavity surface-emitting laser ("VCSEL") for example, emits light rays 66(1) radially outward into device mirror assembly 48(1). The light rays 66(1) reflect off internal reflection surfaces 68(1) and 70(1) before exiting the device mirror assembly 48(1) at the device optical interface 26(1). The surfaces 68(1) and 70(1) may employ total internal reflection or a reflective coating applied to the reflective surfaces 68(1) and 70(1). It should also be understood that surfaces 68(1) and 70(1), as well as other reflective surfaces described herein, need not be planar. For example, one or more of surfaces 68(1) and 70(1) could be curved, thereby acting as a collimating or focusing element.

It can be seen from FIG. 3 that device mirror assembly 48(1) permits the light rays 66(1) to diverge, thereby increasing a diameter of the beam before exiting the device optical interface 26(1). It can also be seen from FIG. 3 that the device mirror assembly 48(1) allows the light-emitting element 64(1) to be vertically offset from the display surface 14(1) less than the total distance required for the beam of light rays 66(1) to expand to a desired diameter before exiting the device optical interface 26(1), thereby permitting the device 12(1) to maintain a compact and thin form factor. In this embodiment, the optical path between the reflection surface 70(1) and the display surface 14(1) is substantially perpendicular to a plane defined by the display surface 14(1), and a portion of the optical path between the reflection surface 70(1) and the light-emitting element 64(1) (or other internal optical interface), i.e., the optical path between the reflection surface 70(1) and the reflection surface 68(1) is substantially parallel to the display surface 14(1). The optical path between the reflection surface 68(1) and the light-emitting element 64(1) (or other internal optical interface) is substantially perpendicular to the display surface 14(1). It should be understood that other arrangements that permit a compact overall form factor for the device 12(1) are also contemplated.

Collimating lens 62(1) collimates the light rays 66(1) exiting device optical interface 26(1) into an essentially collimated beam through display surface 14(1). In this embodiment, display surface 14(1) is part of a clear glass display 72(1), but it should be understood that other types of displays may also be used. It should also be understood that the display surface 14(1) may also include additional optical features for aiding transmission of the light rays 66(1) through the display surface 14(1). In this example, when the light rays 66(1) exit the display glass, light rays 66(1) travel through window 60(1) and into focusing lens 58(1), which refocuses the beam of light rays 66(1) such that the light rays 66(1) re-converge and enter optical fiber 34(1) disposed in the ferrule 36(1). Similar to the device mirror assembly 48(1), a connector mirror assembly 38(1) may include one or more reflective surfaces 73(1), which may likewise permit the connector 10(1) to maintain a compact form factor as well. In this example, the optical axis of ferrule 36(1) is disposed at a right angle to the optical axis of focusing lens 58(1) and connector optical interface 24(1). However, it should be understood that other arrangements are contemplated. For example, as an alternative to the "periscope"-style optical arrangement described above, the optical axes may be rotationally shifted by as much as 15° about one or more axes, while retaining the integrity of the optical connection.

In this embodiment, the mechanical and optical alignment is primarily provided by the connector frame 28(1). In this regard, FIGS. 4A through 4C illustrate lower perspective, upper perspective, and bottom views of a connector frame 28 of the connector 10(1) according to the embodiment of FIG. 1. In particular, the views shown by FIG. 4A through 4C illustrate the display alignment features 18(1) and mechanical alignment feature 20(1) of the connector frame 28(1). As shown by FIGS. 4A through 4C, connector frame 28(1) includes a main frame body 74(1) that carries mechanical alignment feature 20(1). A connection member 76(1) extends away from the main frame body 74(1), and the cantilevered extension member 78(1) extends from connection member 76(1) in the direction of the mechanical alignment feature 20(1). The extension member 78(1) carries the ferrule 36(1) and connector optical interface 24(1), and includes a display facing surface 80(1), on which the display alignment features 18(1) are disposed. In this embodiment, each display alignment feature 18(1) defines a contact surface for directly contacting the display surface 14(1) of the device 12(1) when the mechanical alignment feature 20(1) is mated to the device 12(1). In this embodiment, connector frame 28(1) also includes a pair of connector pin holes 82(1), each of which carries a conductive pin 84(1), such as a pogo pin for example, for creating and maintaining electrical contact when the connector 10(1) is mounted to the device 12(1).

Figure 5A:
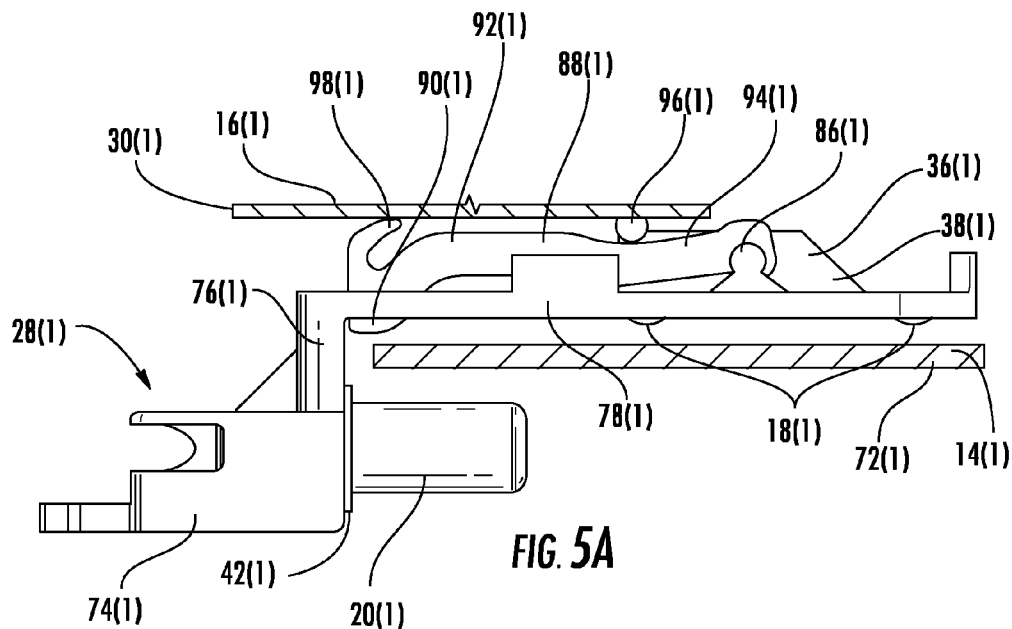
FIGS. 5A and 5B are side views of the connector frame of FIGS. 4A-4C and a portion of the display surface and connector housing, illustrating how connection of the connector to the device causes an arm to pivot the connector optical interface into contact with the display surface of the device.
Figure 5B:
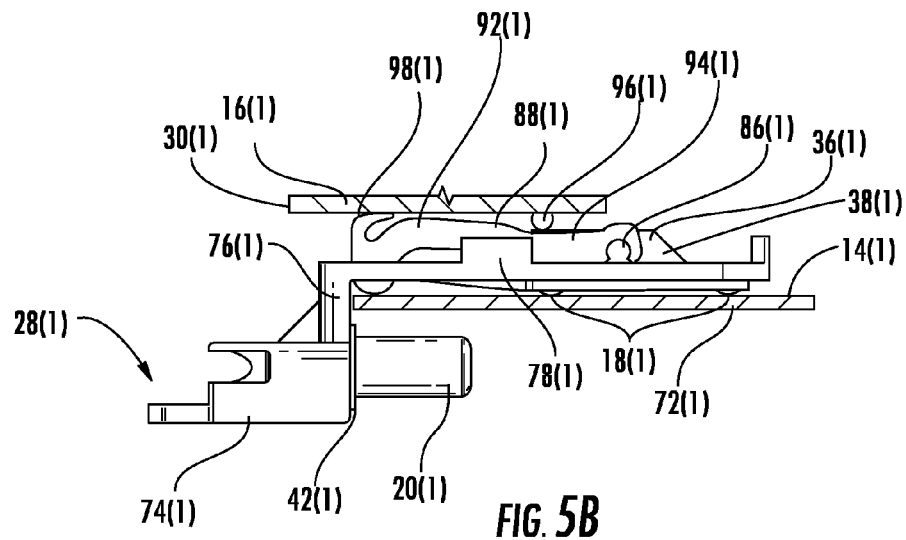

In this embodiment, the display facing surface 80(1) is cantilevered from the connection member 76(1) such that display facing surface 80(1) is able to move into contact with the display surface 14(1) when the connector 10(1) is connected to the device 12(1). As shown in FIG. 4B, a pair of ferrule pivots 86(1) are disposed on either side of ferrule 36(1), to facilitate biasing of the display alignment features 18(1) of display facing surface 80 into contact with the display surface 14(1). In this regard, FIGS. 5A and 5B are side views of the connector frame of FIGS. 4A through 4C. Also shown is a portion of the connector housing 30(1) and display glass 72(1). As shown in FIG. 5A, an actuator 88(1) is disposed between the connector housing 30 and each ferrule pivot 86(1). In this example, the actuator 88(1) is a pivotable arm. As the mechanical alignment feature 20(1) is mated with the device alignment feature 22(1) of device 12(1), a portion of the device 12(1), such as the display surface 14(1), presses against pivot engagement portion 90(1) of actuator 88(1). As a result, a connector end 92(1) of the actuator 88(1) is urged away from the display surface 14(1), thereby urging a ferrule end 94(1) of the actuator 88(1) toward the display surface 14(1) as the actuator 88(1) pivots about a connector pivot 96(1) disposed within connector housing 30(1). As shown in FIG. 5B, as the ferrule end 94(1) of actuator 88(1) biases the display facing surface 80(1) toward the display surface 14(1), a bias member 98(1) is compressed against the connector housing 30(1). When the connector 10(1) is removed from device 12(1), the connector end 92(1) of actuator 88(1) is biased away from the connector housing 30(1) by bias member 98(1), thereby moving the display alignment features 18(1) of display facing surface 80(1) away from the display surface 14(1) as the connector 10(1) is removed. This mechanism thereby allows the display alignment features 18(1) to form a precisely aligned optical connection with the device optical interface 26(1) and connector optical interface 24(1), while ensuring that the display alignment features 18(1) do not contact the display surface 14(1) during insertion or removal of the connector 10(1), thereby preventing damage to the display alignment features 18(1) and to the display surface 14(1).

Figure 6A:
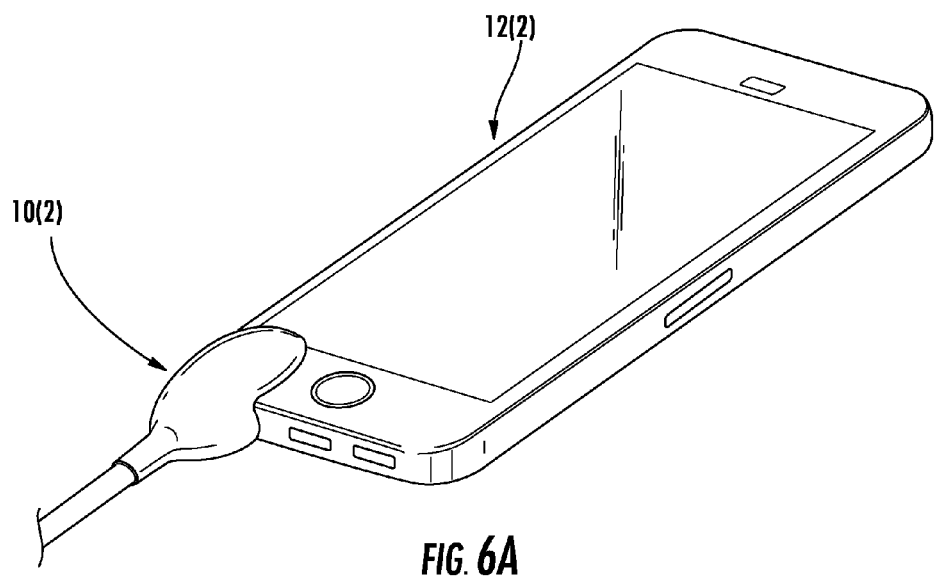
FIGS. 6A and 6B illustrate perspective views of a fiber optic connector according to an alternative embodiment, including a connector optical interface that remains in contact with the display surface during insertion and removal of the connector.
Figure 6B:
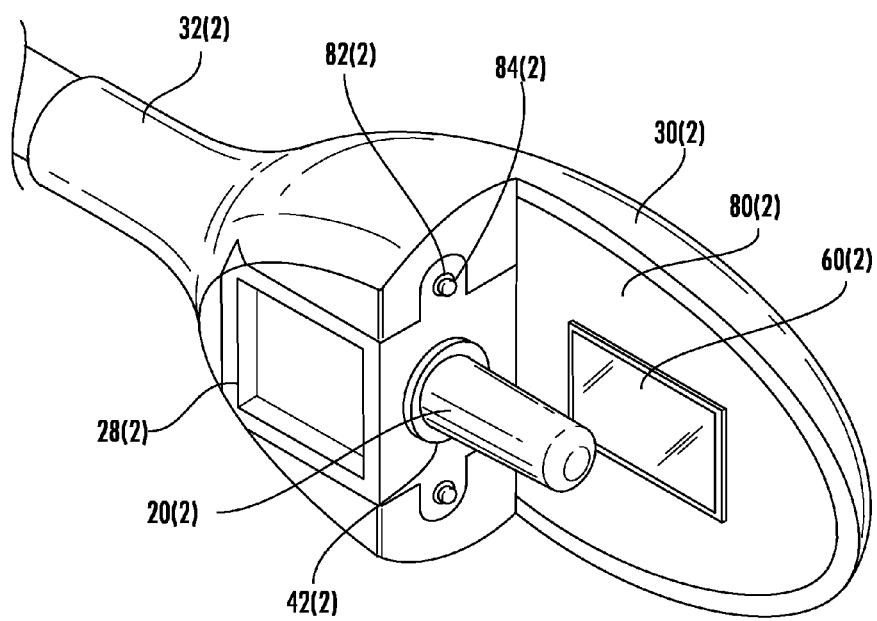

According to an alternative embodiment, a connector may alternatively include a stationary window disposed on display facing surface that is configured to engage the display surface of the device during insertion and removal of the connector as well. In this regard, FIGS. 6A and 6B illustrate an alternative connector 10(2) according to an alternative embodiment. As shown by FIGS. 6A and 6B, the connector housing 30(2) and connector frame 28(2) may employ a variety of different shapes. In addition, in this embodiment, display facing surface 80(2) is stationary with respect to the rest of the connector 10(2), thereby causing window 60(2) to engage the display surface 14(2) of device 12(2) during insertion and removal of the connector 10(2) from device 12(2). One advantage of this arrangement is that simpler parts may be used to assemble the connector 10(2), thereby reducing the manufacturing cost of the connector 10(2).

Figure 7:
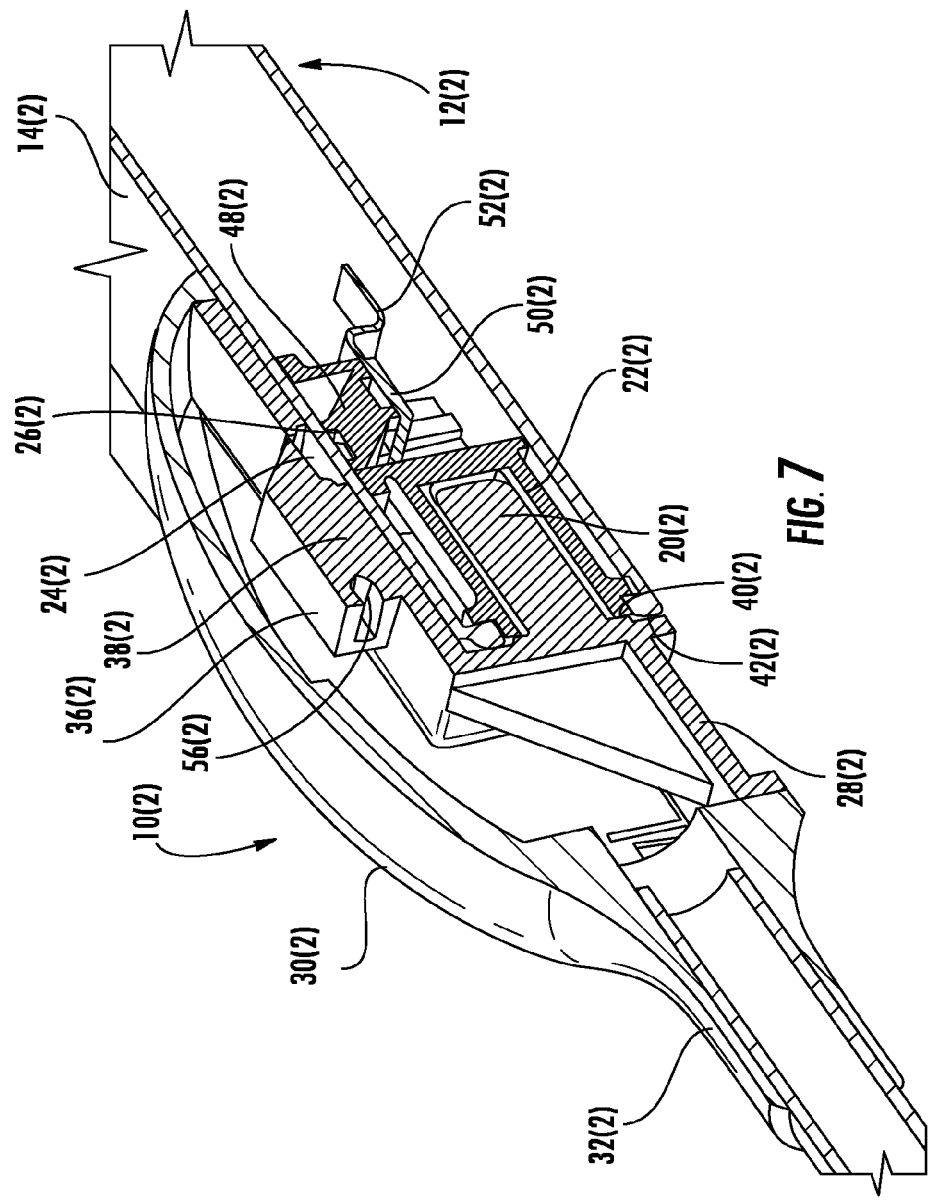
FIG. 7 is a perspective cutaway view of the fiber optic connector of FIGS. 6A and 6B optically connected to the portable device via the display surface of the device, illustrating the internal components thereof.

In this regard, FIG. 7 is a perspective cutaway view of the fiber optic connector of FIGS. 6A and 6B is illustrated. Similar to FIGS. 2A and 2B, FIG. 7 illustrates the internal components of connector 10(2) and device 12(2). In particular, it can be seen that connector optical interface 24(2) and ferrule 36(2) are stationary with respect to the rest of the connector frame 28(2), as well as the other components of the connector 10(2). As shown by FIGS. 8A and 8B, ferrule 36(2) may be formed as a separate part from connector frame 28(2) and may be held stationary by securing the ferrule 36(2) to the connector frame 28(2). For example, in this embodiment, ferrule 36(2) includes a pair of ferrule engagement members 100(2) that extend along a length of the ferrule 36(2). Ferrule engagement springs 102(2) retain the ferrule engagement members 100(2) against the extension member 78(2) of connector frame 28(2) in this embodiment.

Figure 9:
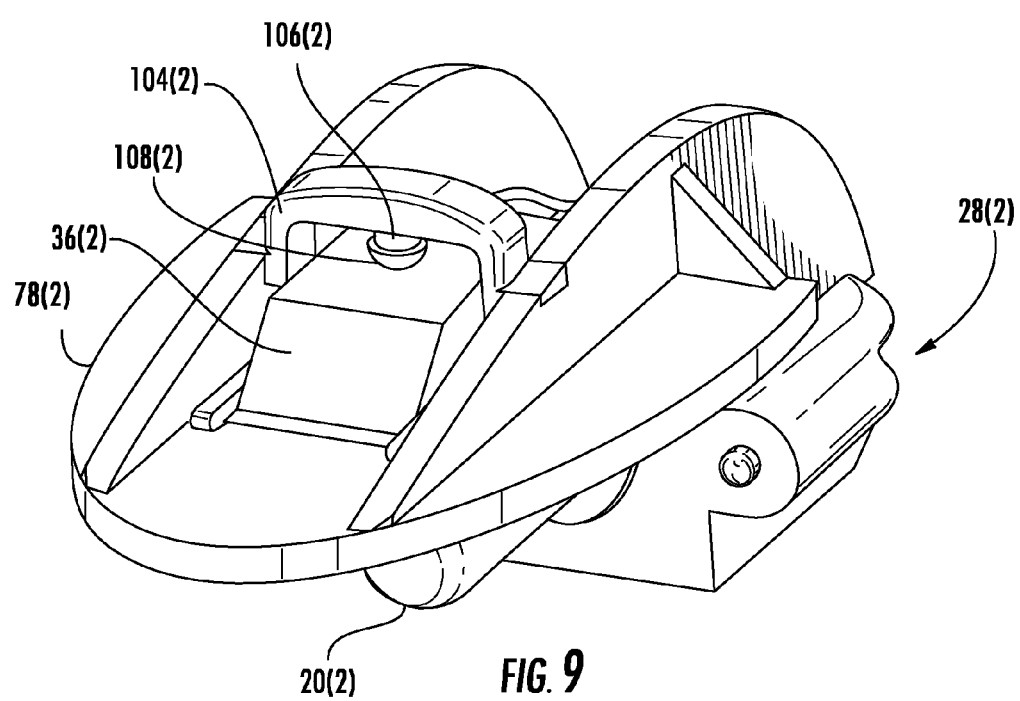
FIG. 9 is a perspective view of an alternative connector frame of the connector according to the embodiment of FIGS. 6A and 6B, illustrating an alternative retention arrangement for the connector optical interface.

Other methods of retaining the ferrule 36(2) on the extension member 78(2) of connector frame 28(2) are also contemplated. In this regard, FIG. 9 illustrates a perspective view of an alternative connector frame 28(2) of the connector 10(2) according to the embodiment of FIGS. 6A and 6B, in which a retention member 104(2) extends across and over the ferrule 36(2). A ball 106(2) and socket 108(2) joint retains the ferrule 36(2) against the extension member 78(2) of the connector frame 28(2) in this embodiment. One advantage of this arrangement is that the ferrule 36(2) is able to "float," i.e., shift slightly in one or more axes against the connector frame 28(2) to reduce stress on the ferrule 36(2) and connector frame 36(2) while still maintaining a secure retention of the ferrule 36(2) against the connector frame 28(2).

Other retention or alignment mechanisms may be employed as well. In this regard, FIGS. 10A and 10B illustrate perspective views of the fiber optic connector 10(3) according to another alternative embodiment including a magnetic alignment feature that couples and optically aligns the connector optical interface 24(3) of connector 10(3) with the device optical interface 26(3) of device 12(3). Similar to the embodiments illustrated by FIGS. 1 through 9 above, connector 10(3) is configured to connect to the device 12(3) via a mechanical alignment feature 20(3), which mechanically and optically aligns the connector optical interface 24(3) with a complementary device optical interface 26(3) of device 12(3). In addition to the mechanical alignment feature 20(3), in this embodiment, one or more magnetic elements disposed in the connector 10(3) and/or device 12(3) cooperate to retain and align the connector 10(3) with the device 12(3).

Figure 11:
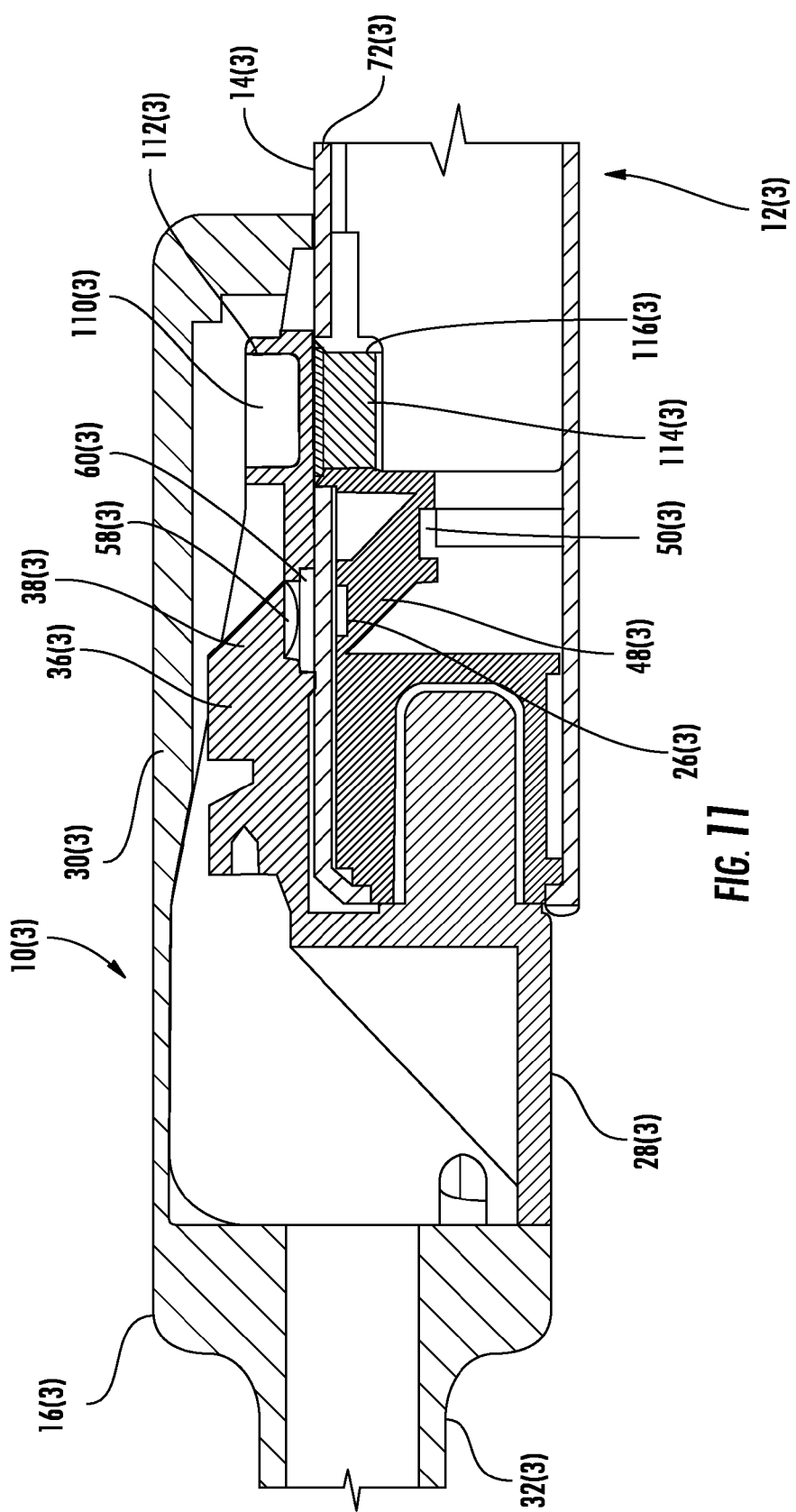
FIG. 11 is a side cutaway view of the fiber optic connector of FIGS. 10A and 10B optically connected to the portable device via the display surface of the device, illustrating the internal components thereof.

In this regard, FIG. 11 illustrates a side cutaway view of the fiber optic connector 10(3) of FIGS. 10A and 10B optically connected to the device 12(3) via the display surface 14 of the device 12(3). In this embodiment, one or more magnetic elements 110(3) are disposed in the recess 112(3) of connector frame 28(3), for example. When mechanical alignment feature 20(3) is inserted into device alignment feature 22(3) of the device 12(3), the magnetic element 110(3) aligns with a complementary magnetic element 114(3) in a complementary recess 116(3) within the device body 46(3) of device 12(3) proximate to the display surface 14(3). For example, magnetic element 114 may be disposed behind display glass 72(3), or alternatively, magnetic element 114(3) may be disposed in a cutout portion of the display glass 72(3). As shown by FIG. 11, magnetic attraction between magnetic element 110(3) and magnetic element 114(3) may cause the magnetic elements 110(3) and 114(3) to align with each other, thereby aligning connector optical interface 24(3) with device optical interface 26(3).

Figure 12A:
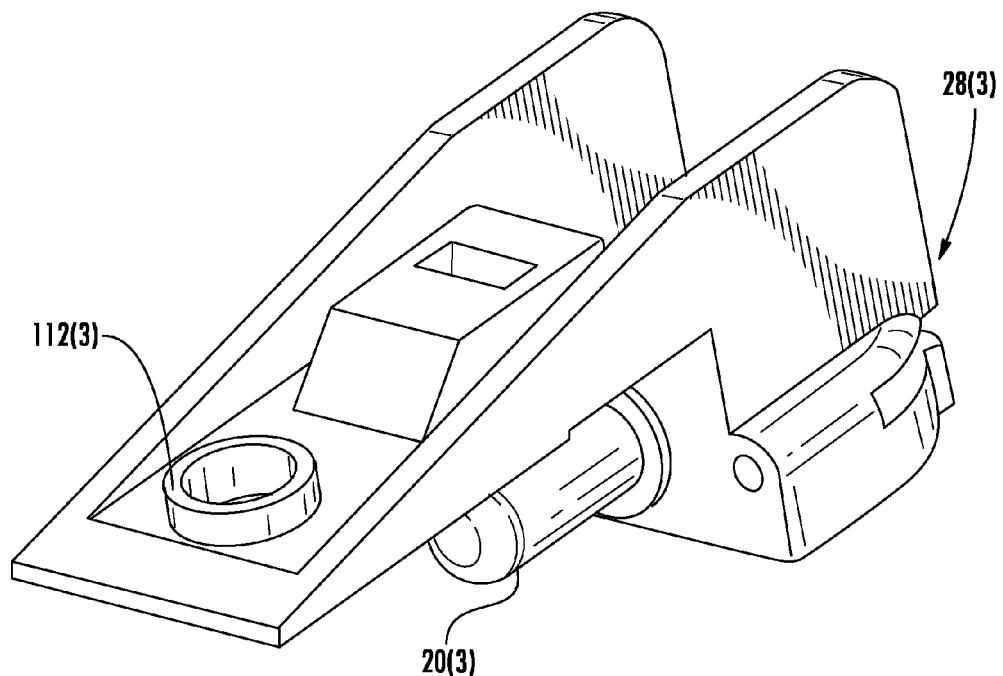
FIGS. 12A and 12B are perspective views of the connector frame of the connector and receptacle body according to the embodiment of FIGS. 10A and 10B, illustrating the magnetic alignment features of the connector frame and receptacle body.
Figure 12B:
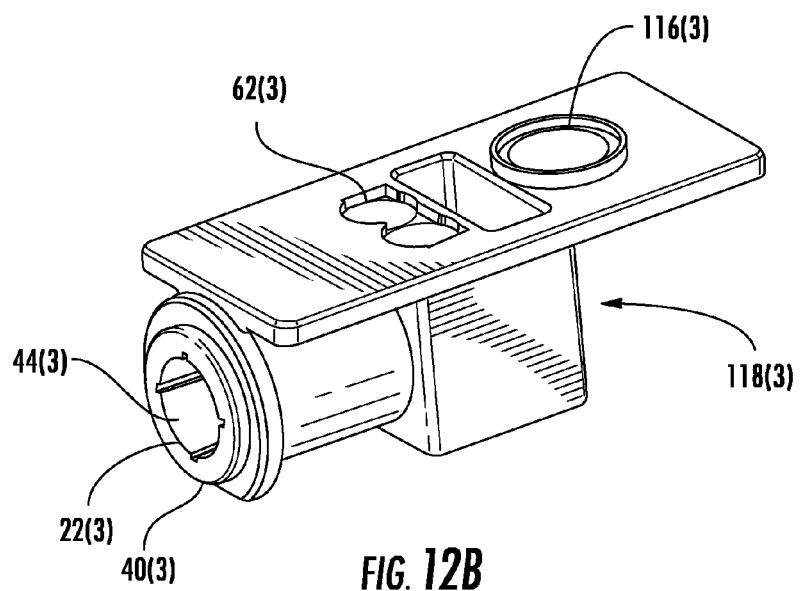

In this regard, FIGS. 12A and 12B are perspective views of a connector frame 28(3) of the connector 10(3) having a recess 112(3) for a magnetic element 110(3), according to the embodiment of FIGS. 10A and 10B, and a monolithic receptacle body 118(3) having a recess 116(3) for retaining magnetic element 114(3), and arranged to be disposed in the device body 46(3) of device 12(3). As discussed above, as mechanical alignment feature 20(3) is inserted into device alignment feature 22(3), recesses 112(3) and 116(3) align with each other, and the complementary magnetic elements 110(3) and 114(3) are attracted to each other and hold the connector frame 28(3) and receptacle body 118(3) in alignment with each other.

Figure 13B:
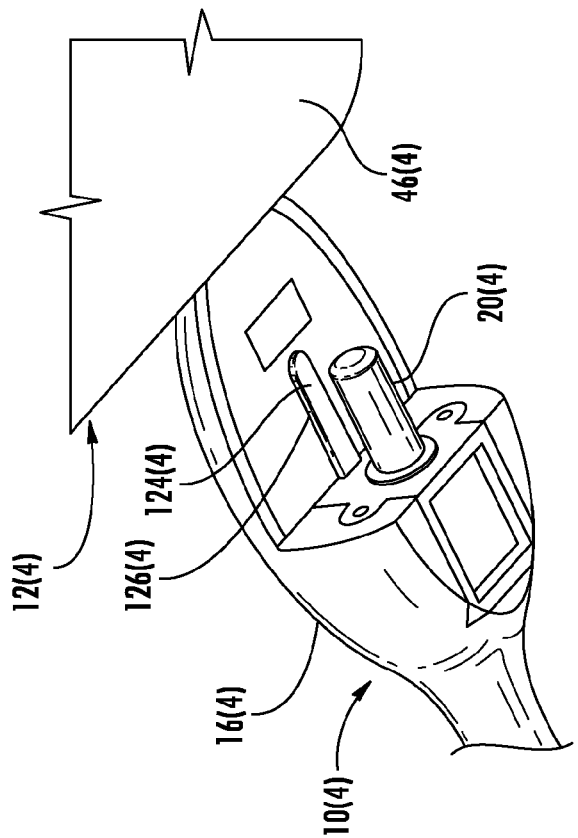
FIGS. 13A and 13B illustrate perspective views of a fiber optic connector according to another alternative embodiment, including a tongue and groove alignment feature for aiding mechanical and optical alignment of the connector optical interface with the device optical interface.
Figure 13A:
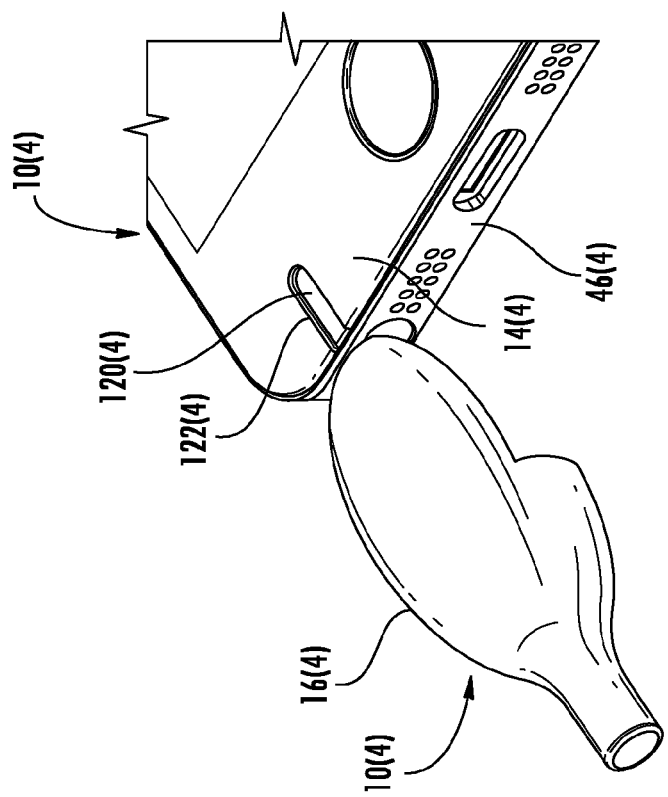

Additional features may be employed to optically align connector optical interface 24(4) with device optical interface 26(4). In this regard, FIGS. 13A and 13B illustrate perspective views of a fiber optic connector 10(4) according to another alternative embodiment, including a groove 120(4) or similar recess formed in the display surface 14 and defining an engagement surface 122(4). The groove 120(4) is configured to receive a complementary tongue element 124(4) or similar protrusion disposed on the display facing surface 80(4) of connector 10(4). The tongue element 124(4) includes a complementary engagement surface 126(4) that mates with engagement surface 122(4) to further secure connector 10 with respect to device 12(4), and to retain connector optical interface 24(4) in optical alignment with device optical interface 26(4).

In this regard, FIG. 14 is a perspective cutaway view of the fiber optic connector 10(4) of FIGS. 13A and 13B optically connected to the device 12(4) via the display surface 14(4) of the device 12(4). As can be seen in FIG. 14, tongue element 124(4) is received by and mates with groove 120(4) formed in the display surface 14(4). This arrangement has the advantage of securing the cantilevered end of the connector 10(4) against additional mechanical movement that may be caused by stress or strain on the mechanical alignment feature 20(4) of the connector 10(4).

Figure 15:
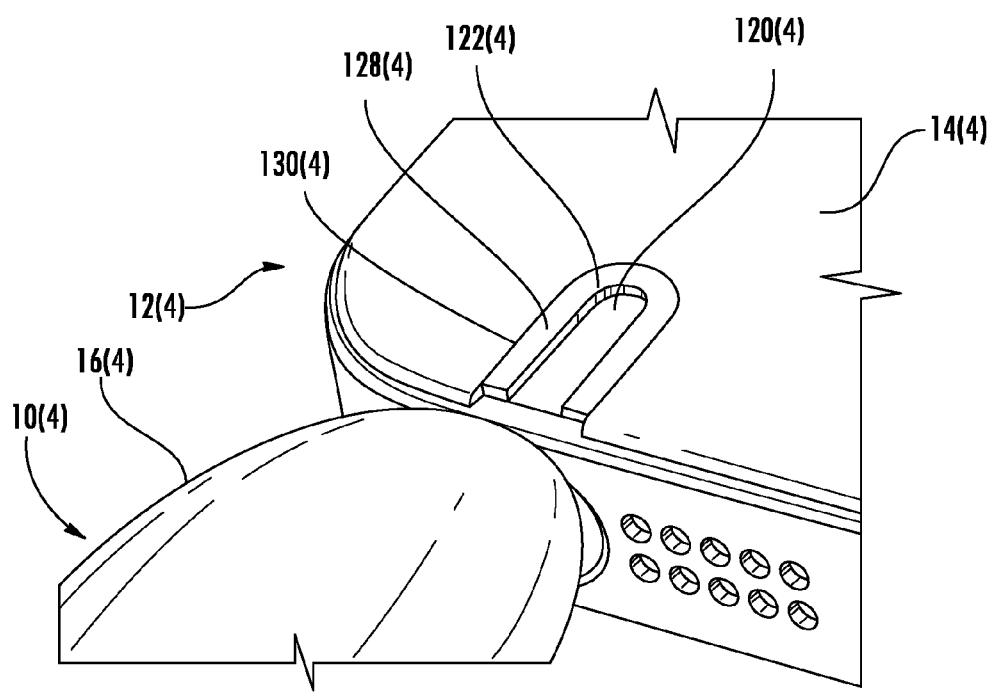
FIG. 15 is a perspective view of a variant of the groove alignment feature of the embodiment of FIGS. 13A and 13B, including an intermediate surface between the display surface groove and the groove for receiving the tongue feature of the connector.

In an alternative embodiment illustrated by FIG. 15, engagement surface 122(4) may be disposed on an intermediate surface 128(4) disposed within a larger groove 130(4) within the display surface 14(4). In one embodiment, the intermediate surface 128(4) comprises a conductive material, thereby permitting electrical communication between the connector 10(4) and device 12(4). In this manner, the connection and alignment features of connector 10(4) with device 12(4) may facilitate other secondary features as well.

Additional features and modifications are contemplated as well. For example, waveguides and turning elements may be disposed within the display edge coupled light that propagates in parallel with the display surface using waveguides and turning elements in the display glass 72 or other display element. Vertically coupled light that is turned into parallel propagating light in the display glass using a turning element similar to the reflective surfaces described in FIG. 3, such that the light propagates parallel to the surface within the flat glass element. Waveguides can also be directed around the actual display area so as to not interfere with an image being transmitted through the glass.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic connector for optically connecting to a device through a display surface of the device, comprising:
   a display alignment feature configured to align with a display surface of a device;
   a mechanical alignment feature configured to mate with a device alignment feature of a device body of the device that supports the display surface such that the display alignment feature is retained against the display surface of the device when the mechanical alignment feature is mated with the device alignment feature of the device; and
   a connector optical interface configured to optically connect to a device optical interface of the device through the display surface of the device when the display alignment feature is aligned with the display surface of the device.

2. The fiber optic connector of claim 1, wherein:
   the display alignment feature is part of a monolithic plug body of the connector.

3. The fiber optic connector of claim 1, further comprising a mechanical actuator connected between the plug body and the connector optical interface, wherein mating the mechanical alignment feature with the device alignment feature causes the mechanical actuator to urge the optical interface into contact with the display surface of the device.

4. The fiber optic connector of claim 3, wherein the mechanical actuator comprises at least one pivotable arm configured to rotate the connector optical interface into contact with the display surface of the device when the mechanical alignment feature is mated to the device.

5. The fiber optic connector of claim 4, wherein the mechanical actuator comprises at least one bias member configured to bias the optical interface out of contact with the display surface when the mechanical alignment feature is de-mated from the device.

6. The fiber optic connector of claim 1, wherein the mechanical alignment feature comprises at least one plug.

7. The fiber optic connector of claim 6, wherein the at least one plug is an audio jack plug.

8. The fiber optic connector of claim 1, further comprising at least one ferrule configured to receive at least one optical fiber, such that a received optical fiber is optically connected to the device optical interface when the connector is connected to the device.

9. The fiber optic connector of claim 8, wherein the at least one ferrule is configured to connect the at least one optical fiber in an optical axis at a substantially right angle to an optical axis of the connector optical interface.

10. The fiber optic connector of claim 9, wherein the at least one ferrule comprises at least one internal reflection surface for directing light between the at least one optical fiber and the connector optical interface.

11. The fiber optic connector of claim 1, wherein the connector optical interface comprises at least one lens.

12. The fiber optic connector of claim 1, further comprising at least one electrical conductor configured to electrically connect to an electrical connection feature of the device.

13. The fiber optic connector of claim 1, wherein the connector optical interface comprises at least one contact surface for contacting the display surface of the device when the display alignment feature is aligned with the display surface of the device.

14. The fiber optic connector of claim 1, further comprising at least one magnetic element configured to magnetically couple and align the display alignment feature of the connector to a portion of the display surface having a complementary magnetic element disposed in the device proximate to the portion of the display surface.

15. The fiber optic connector of claim 1, further comprising at least one protrusion extending from the display alignment feature and configured to mate with a corresponding recess in the display surface of the device when the connector is connected to the device.

16. The fiber optic connector of claim 15, wherein the at least one protrusion is a tongue and the corresponding recess is a groove.

17. An internal optical interface assembly for a device for optically connecting through a display surface of the device, the optical interface assembly comprising:
    a monolithic receptacle body comprising:
        a longitudinal bore defining a device alignment feature; and
        an internal optical interface,
    wherein the internal optical interface is disposed behind a display surface of the device and configured to optically connect to an optical interface of a fiber optic connector through the display surface of the device, when the fiber optic connector is connected to the device, and the device alignment feature is disposed in a device body of the device that supports the display surface.

18. The internal optical interface assembly of claim 17, further comprising a first reflective element disposed in an optical path between the display surface and the internal optical interface;
    wherein the optical path between the first reflective element and the display surface is substantially perpendicular to a plane defined by the display surface; and
    wherein at least a portion of the optical path between the first reflective element and the internal optical interface is substantially parallel to the plane defined by the display surface.

19. The internal optical interface assembly of claim 18, further comprising a second reflective element disposed in the optical path between the first reflective element and the internal optical interface;
    wherein the optical path between the first reflective element and the second reflective element is substantially parallel to the plane defined by the display surface; and
    wherein the optical path between the second reflective element and the internal optical interface is substantially perpendicular to the display surface.

20. The internal optical interface assembly of claim 17, further comprising at least one magnetic element proximate to the display surface of the device configured to magnetically couple and align a display alignment feature of the connector to a portion of the display surface such that the optical interface of the connector is in optical communication with the internal optical interface.

21. The internal optical interface assembly of claim 17, further comprising a waveguide disposed behind the display surface of the device configured to direct light between the display surface and the internal optical interface.

22. The internal optical interface assembly of claim 17, wherein the longitudinal bore of the device alignment feature is an audio jack.

23. A method of optically connecting a connector to a device comprising:
    mechanically connecting a mechanical alignment feature of a connector to a device alignment feature of a device to urge a connector optical interface of the connector into contact with a display surface of the device, thereby optically connecting the connector optical interface of the connector to a device optical interface of the device through the display surface of the device,
    wherein urging the optical interface into contact with the display device comprises rotating at least one pivotable arm configured to rotate the connector optical interface into contact with the display surface of the device when the mechanical alignment feature is mated to the device.

24. The method of claim 23, further comprising biasing the optical interface out of contact with the display surface when the mechanical alignment feature is de-mated from the device.

* * * * *